United States Patent [19]

LaLone

[11] 4,012,975

[45] Mar. 22, 1977

[54] HIGH SPEED PUNCHING APPARATUS AND TOOL THEREFOR

[76] Inventor: Barry Grant LaLone, 268 W. Clarkston Road, Lake Orion, Mich. 48035

[22] Filed: July 31, 1975

[21] Appl. No.: 600,636

[52] U.S. Cl. .................................. 83/140; 83/382; 83/389; 83/395; 83/916
[51] Int. Cl.² ................... B26D 7/18; B23D 27/00
[58] Field of Search ............ 83/140, 382, 383, 387, 83/389, 395, 916

[56] References Cited

UNITED STATES PATENTS

| | | | |
|---|---|---|---|
| 1,723,106 | 8/1929 | Wiglenda | 83/395 X |
| 2,394,346 | 2/1946 | Wiedman | 83/387 |
| 2,650,663 | 9/1953 | Wales et al. | 83/916 X |
| 3,205,742 | 9/1965 | Williamson | 83/140 |
| 3,368,436 | 2/1968 | Weisbeck | 83/140 |
| 3,481,236 | 12/1969 | Nicklasson | 83/140 |
| 3,926,082 | 12/1975 | Langendorff | 83/140 |

*Primary Examiner*—Willie G. Abercrombie
*Attorney, Agent, or Firm*—Harness, Dickey & Pierce

[57] ABSTRACT

A high speed punching apparatus for cutting parts out of generally flat stock with said apparatus including means for selectively adjusting the tool stripping force to accommodate different materials, means for avoiding possible cutting of an overlaying template, means for minimizing friction between the punching tool and associated die button, means for minimizing hangup of burrs on the work piece in the die button and also a punching tool having means for minimizing friction and for expelling chips cut from the workpiece.

25 Claims, 5 Drawing Figures

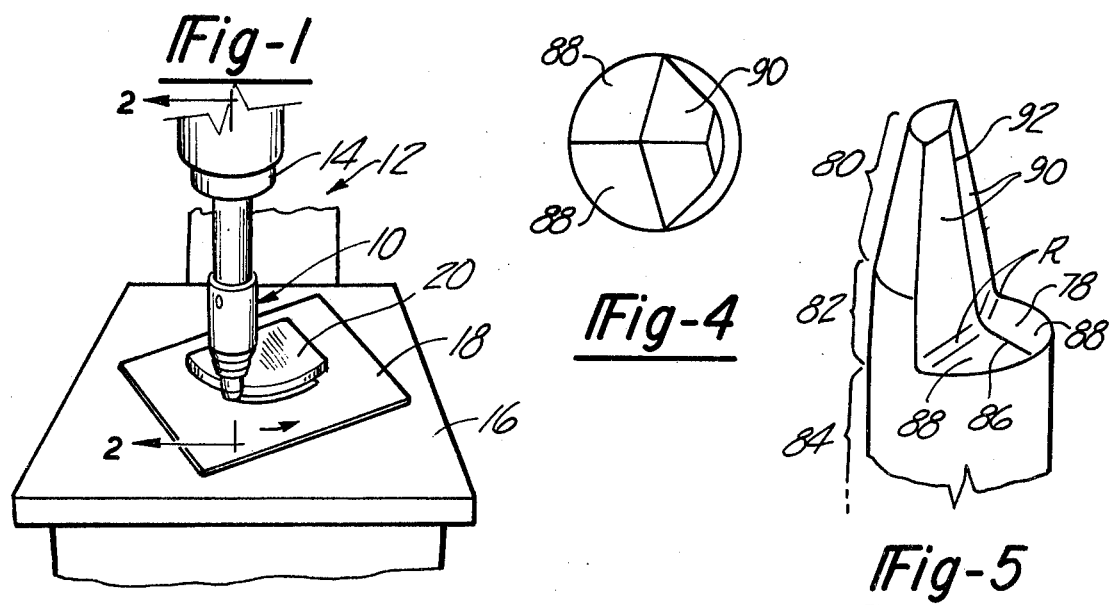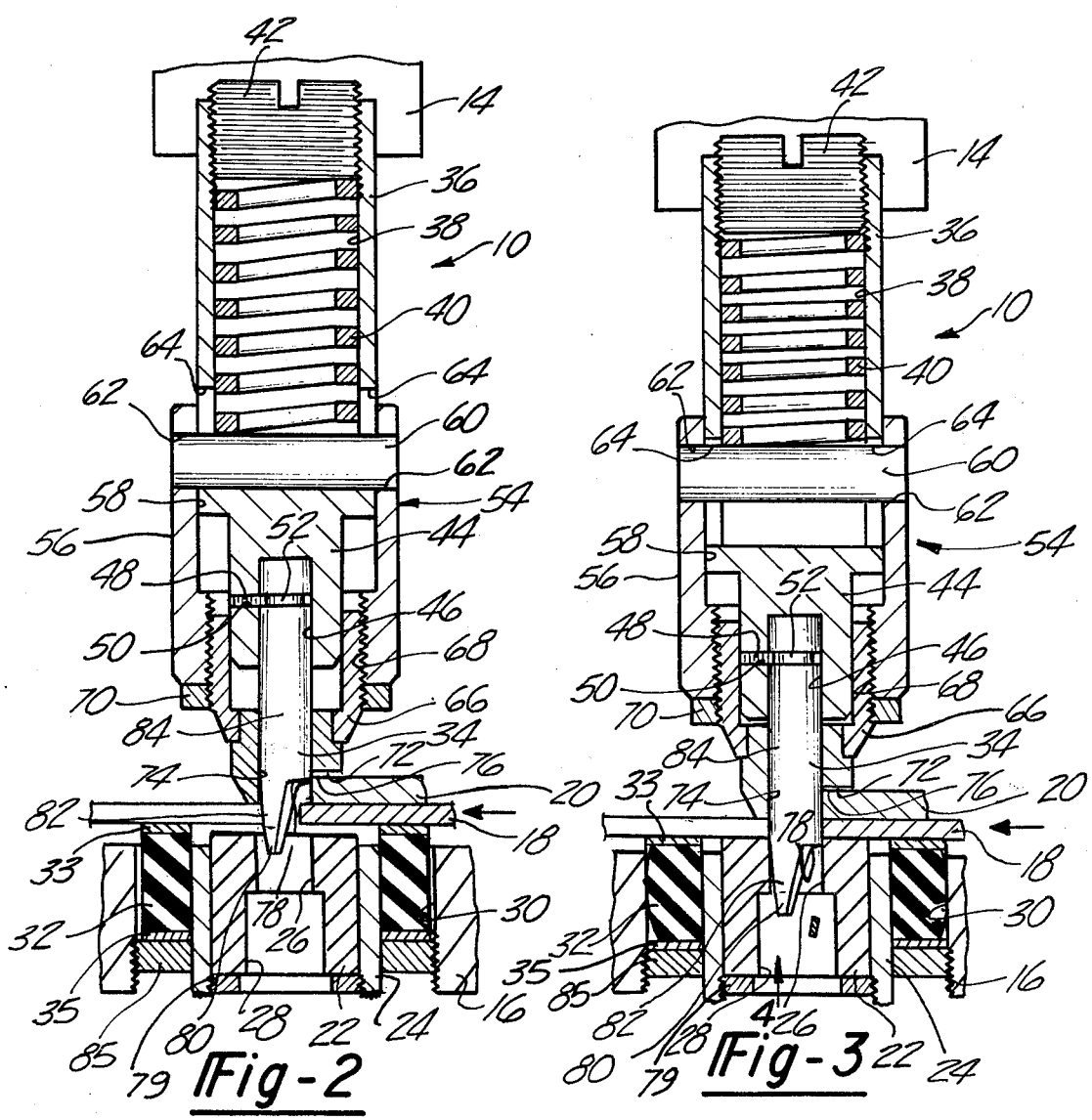

HIGH SPEED PUNCHING APPARATUS AND TOOL THEREFOR

SUMMARY BACKGROUND OF THE INVENTION

The present invention relates to high speed punching apparatus for cutting parts out of generally flat stock and to a punching tool therefor.

It has been the practice to produce low production sheet metal parts having intricate shapes by means of a band saw. The problem with use of a band saw is the time required to cut the part and the accuracy with which the part can be cut. High speed punching or nibbling, while capable of providing faster results, have had difficulties in tool and die life. Difficulties have been encountered with apparatus accommodating materials of different thickness and hardness and for accommodating a dull tool versus a sharp tool whereby tool stripping is a problem. Difficulties have also been encountered in hang up of burrs on the workpiece in the die button whereby smooth, workpiece feed is inhibited.

The present invention provides apparatus for varying the tool stripping force whereby variation of material thickness and hardness and in the cutting condition of the tool or die can be selectively accommodated. Therefore, it is an object of the present invention to provide apparatus of the above described type having novel means for adjusting to tool stripping force whereby differences in material and tool condition can be accommodated.

The present invention provides a novel stock or workpiece rest for periodicially raising the stock away from the die button sufficiently to provide clearance of the formed burrs out of the opening of the die button whereby workpiece feed will not be inhibited. Therefore, it is another object of the present invention to provide apparatus of the above described type including novel stock rest means whereby burr clearance is provided and stock feed is facilitated.

The present invention can be used with a template and has a novel structure assuring that the template will not be cut by the punching tool. Therefore, is is another object of the present invention to provide apparatus of the above described type for use with a template including a novel structure whereby cutting of the template is obviated.

The present invention also provides a novel punching tool structure by which friction with the associated die button is minimized thereby increasing tool life. It is therefore still another object of the present invention to provide a novel punching tool structure in which friction with the associated die button is minimized.

In the present invention the punching tool has a preselected shape whereby the punched workpiece chips will be expelled; therefore it is another object of the present invention to provide a novel punching tool having a preselected shape for assuring that workpiece chips are expelled.

Other objects, features, and advantages of the present invention will become apparent from the subsequent description and the appended claims, taken in conjunction with the accompanying drawing, in which:

FIG. 1 is a pictorial view of the novel apparatus and novel punching tool of the present invention;

FIG. 2 is a sectional view taken generally along the lines 2—2 in FIG. 1 and with the punching tool shown in its raised position prior to cutting;

FIG. 3 is a view similar to that of FIG. 2 showing the punching tool at the completion of its cutting stroke;

FIG. 4 is a view of the cutting end of the punching tool looking in the direction of the arrow 4 in FIG. 3; and FIG. 5 is a pictorial view of the cutting end of the punching tool.

Looking now to FIG. 1 a punching tool assembly 10 is shown in assembly relation with a reciprocating tool assembly 12 (only partially shown). The reciprocating tool assembly 12 includes a collet 14, which can be of a conventional, known construction, for gripping one end of the punching tool assembly 10. The collect 14, and hence tool assembly 10, can be actuated for up and down motion by a reciprocating drive mechanism (not shown) associated with the reciprocating tool assembly 12. A work bed or table 16 is associated with the reciprocating tool assembly 12 and operates to support the workpiece to be punched.

In FIG. 1 a workpiece 18 is being punched to form a part having the same shape as a template 20.

Looking now to FIG. 2, the table 16 has a die button 22 located in a support sleeve 24. The button 22 and sleeve 24 are secured together and are held to the table 16. Both the button 22 and sleeve 24 are annular with the button having a circular die opening 26 which communicates with an enlarged counter bore 28. An annular goove 30 in the table 16 surrounds the upper portion of the support sleeve 24 and button 22 and includes a stock support ring 32 which is of a sandwich construction including upper and lower metallic rings 33 and 35 and a center member 37 made of a resilient, elastomeric material; the ring 32 serves a purpose to be described.

The die button 22 co-operates with a punching tool 34 which in turn is held for reciprocal motion with the reciprocating tool assembly 10.

The tool assembly 10 includes an upper tubular member 36 having a bore 38 at its upper end. A stripper coil spring 40 is located in bore 38. A cap 42 is threadably supported on the extreme end of bore 38 and can be moved more or lss into bore 38 to provide more or less compression on spring 40. The upper member 36 terminates in a reduced diameter tool holding portion 44 which has a bore 46 adapted to receive the shank of the punching tool 34. A set screw 48 is threadably located in a cross bore 50 adapted to communicate with an annular slot 52 in the shank of tool 34 whereby the tool 34 can be axially retained. The uppermost end of tubular member 36 is adapted to be gripped by the collect 14 whereby the tool assembly 10 can be reciprocated via the collect 14.

The spring 40 functions with a tool stripper assembly 54. The assembly 54 includes a movable outer sleeve member 56 which has an upper bore 58 which slidably receives the lower end of the upper member 36. A cross pin 60 extends diametrically through the upper end of sleeve member 56 and is fixed in a pair of aligned bores 62. The pin 60 extends through a pair of aligned, axially extending slots 64 located on the upper member 36. The lower end of the stripper spring 40 engages the pin 60 and urges the pin 60, and hence the outer sleeve member 56, towards the lowermost end of the slots 64. The magnitude of the force by the spring 40 can be selectively adjusted via the cap 42. A collet 66 is threadably secured in a reduced diameter bore 68 in the lower end portion of the movable sleeve member 56. A lock nut 70 can be threaded to the lower threaded end of the collet 66 and lock the collet 66 into the desired axial position in bore 68. A tubular stripper nose 72 is fixed to the lowermost end of the collet 66. The nose 72 has a bore 74 of a diameter to receive the tool 34 in clearance relationship. The nose 72 has a slot 76 at its end. The slot 76 serves a dual function. If no template is being used and cutting is made along a scribe line, the slot 76 permits viewing of the scribe line as the punching or cutting is performed. If a template, such as template 20, is used, the template 20 can be moved into the slot 76 and in engagement with the lower shank portion of the tool 34 whereby the workpiece 18 can be accurately guided and the workpiece 18 cut with a fine cut to provide a part duplicating the shape of the template. The tool 34 has its cutting edge 78 near its lower end. The axial position of the nose 72 can be varied to accommodate material thickness and for tool sharpening. The cutting surface 78 is located relative to the nose 72 such that at the uppermost position of the tool 34 the cutting surface 78 will be located within the slot 76. This orientation assures that the cutting surface 78 will not extend above the upper surface of the template 20. With this construction then, the inadvertent cutting of the template 20 by the tool 34 is obviated.

The slot 76 extends for at least approximately 180° to assure that template 20 can engage tool 34 for guiding. For other applications an unslotted nose could be used.

It is desirable that the shearing action occur when the workpiece 18 is in engagement with the die button 22. To assure this the die button 22 is located above the surrounding surface of the table 16. A support sleeve 79 vertically supports the die button 22 and can be movably adjusted up or down to adjust the uppermost position of the die button 22. In this way the die button 22 can be sharpened (by machining of its upper surface) and the reduction in height can be accommodated. As the cutting stroke begins, the stipper nose 72 first will be moved into engagement with the workpiece 18 (see FIG. 3). Preferably the ring 32 has a spring rate in comparison to that of the stripper spring 40 and the preload on spring 40 such that the workpiece 18 will be moved into engagement with the die button 22 via the preload on the spring 40. (This motion can also be assisted by engagement of tool 34 with workpiece 18). Spring 40 will then be compressed and the tool 34, along with the upper tubular member 36, will move relatively to the stripper assembly 54. This will result in shearing action as the cutting surface 78 moves into the die opening 26. On the up stroke, the stripper spring 40 will hold the workpice 18 so that the tool 34 can be retracted from the workpiece 18 without hangup. The vertical position of ring 32 can be vertically moved via a support nut 85 such that the upper surface of ring 33 can be adjusted to accommodate the location of the upper position of the die button 22.

If the material of workpiece 18 is relatively soft or if the cutting surface 78 of tool 34 is dull, the occurrence of burrs will be more pronounced; this could provide difficulty in feeding the workpiece 18 since the burrs, which extend vertically from the cut surface, could get caught on the edge of the die button 22. The stock rest 32 performs a valuable function here since at the end of the retraction stroke, it will raise the workpiece sufficiently to move the burrs out from the die opening 26. When the workpiece is moved for the next cut, the burrs will be located above the surface of the button 22 surrounding the opening 26 and on the next downward or cutting stroke these burrs will be flattened. Thus the stock rest facilitates the feed capability of the apparatus and also prevents eventual wear and damage to the die opening 74 from burr engagement during stock feed.

Note that with the apparatus shown, the axial position of the stripper assembly 54 can be varied to accommodate variations in stock thickness. Also note that the stripper force of spring 40 can be varied to accommodate different materials and also to accommodate the condition of the tool 34.

In addition to the above, the tool 34 is provided with features to enhance the cutting operation.

It is expected that the apparatus will be operated at speeds of from 500 to 1,000 strokes/minute, depending upon material thickness, etc. At these high speeds continuous rubbing contact of the tool 34 with the die opening 26 could result in excessive frictional heat and rapid wear of both the tool 34 and die button 22. To avoid this the tool is provided with a tapered tip portion 80 (see FIG. 5). The tip portion 80 extends for the length approximating the stroke of the reciprocating tool assembly 12 and extends from a position between the cutting surface 78 and the end and has a partial frusto conical shape. With this construction, a positive clearance is provided between the tip portion 80 and the confronting surface portion of the die opening 26. Now as the tool 34 is moved downwardly into its cutting stroke a generally straight shank portion 82 is moved into the die opening 26 and has a shape conforming to the die opening 26 and is adapted to engage the confronting surface portion thereof. This same general surface contact occurs as the full shank portion 84 of the tool 34 is moved into the die opening 26. However, the stroke of the reciprocating tool assembly 12 is such that the cutting surface 78 will be moved into the die opening 26 just sufficiently to complete the shearing operation. In practice movement of around 0.016 inch of the surface 78 into the die opening 26 would be adequate. Thus the amount of frictional contact will be limited and on the retracting stroke the tapered tip portion 80 will be located in the die opening 26 such that there will be clearance between tool 34 with die opening 26 permitting cooling on each up stroke. Thus, while the tip portion 80 provides a valuable guiding function, the total surface contact with the die opening 26 is minimized thereby reducing friction and excessive heat and wear.

It is also important that tool chips not adhere to the cutting surface 78. Thus the cutting surface is provided to have a central crown or ridge 86. Surfaces 88 which are adjacent to the crown or ridge 86 taper recedingly away therefrom (downwardly as viewed in FIG. 5, upwardly in FIG. 2). These surfaces 88 are generally transverse to connecting vertical surfaces 90, located on opposite sides of vertical ridge portion 92, which extend from the tip portion 80 and shank portion 82. The surfaces 90 also taper away from the vertical ridge 92 and from the cutting surface 78. The surfaces 88 and 90 by being thereby tapered assist in preventing chip adherence.

It is also important that there be no sharp corner at the joinder of surfaces 88 and 90. The tapered surfaces 88 and 90 are at an angle greater than 90° to each other and hence minimize the sharpness of the corner. In addition, however, a significant radius R is provided to further obviate any sharp corners. It has been found desirable to have the radius R to be of a minimum of around 0.032 inch.

Note that with the structure of the present invention relatively simple structures are used. The die button 22 can be of a conventional annular shape having a die opening 26 of straight, circular cross section. The tool 34 can be machined from straight, conventional stock.

The apparatus of the present invention has great versatility, speed, and accuracy.

While it will be apparent that the preferred embodiments of the invention disclosed are well calculated to fulfill the objects above stated, it will be appreciated that the invention is susceptible to modification, variation and change without departing from the proper scope or fair meaning of the invention.

What is claimed is:

1. In high speed punching apparatus for rapidly, progressively cutting small portions of material from a workpiece along a preselected line and including a support table, a die button supported on the support table, the die button having a die opening and reciprocating apparatus for providing high speed reciprocating motion relative to the support table, the improvement comprising a punching tool assembly adapted to be reciprocated by the reciprocating apparatus, said punching tool assembly including an elongated punching tool adapted to be received within the die opening for reciprocal motion therein, said punching tool providing a shearing action of the workpiece on a downward, cutting stroke and being retracted from the workpiece on an upward, retracting stroke, said punching tool having an elongated shank of a straight cylindrical shape, a cutting surface formed proximate one end, said cutting surface extending for only a portion of the cross section of said shank and being defined by a notch in said shank, said cutting surface having a radially extending surface, said notch having axially extending surface defining an oblique angle with said radially extending surface and connected therewith by a connecting radius whereby said cutting surface, and said axially extending surface of said notch with said connecting radius inhibit hangup of chips on said cutting surface, said shank of said punching tool being generally of the same diameter as the die opening, said punching tool having a tip portion extending generally from a position intermediate said cutting surface and the end of said punching tool, said tip portion having an outer, frusto conical shape of a sufficient length such that said tip portion when located in said die opening can define a clearance relation with the confronting surface of the die opening whereby rubbing, frictional engagement of said shank of said punching tool and the die opening is minimized, tool holding means for removably holding said punching tool and adapted to be held by the reciprocating apparatus, and tool stripping means operatively connected with said tool holding means for stripping the workpiece from said tool on said retracting stroke, said stripping means including stock engaging means for engaging the workpiece during said cutting stroke, and spring means operatively connected with said tool holding means for normally urging said stock engaging means at a predetermined preload axially in the downward direction whereby said stock engaging means strips the workpiece away from said punching tool on said retracting stroke, and load adjustment means selectively adjustable for varying said predetermined preload to vary the stripping force to accommodate differences in materials and the condition of said punching tool.

2. The apparatus of claim 1 with said stock engaging means comprising a nose member adapted to engage the workpiece, and position adjustment means operable for selectively varying the axial position of said nose member relative to said punching tool whereby variations in thickness of the workpiece can be accommodated.

3. The apparatus of claim 2 with said nose being generally annular and having a slot for approximately 180° at its lowermost extremity whereby the surface contact of said nose with the workpiece is no greater than approximately 180°.

4. In high speed punching apparatus for rapidly, progressively cutting small portions of material from a workpiece along a preselected line as determined by a template located on the workpiece and including a support table, a die button supported on the support table, the die button having a die opening and reciprocating apparatus for providing high speed reciprocating motion relative to the support table, the improvement comprising a punching tool assembly adapted to be reciprocated by the reciprocating apparatus, said punching tool assembly including an elongated punching tool adapted to be received within the die opening for reciprocal motion therein, said punching tool providing a shearing action of the workpiece on a downward, cutting stroke and being retracted from the workpiece on an upward, retracting stroke, tool holding means for removably holding said punching tool and adapted to be held by the reciprocating apparatus, and tool stripping means operatively connected with said tool holding means for stripping the workpiece from said tool on said retracting stroke, said stripping means including stock engaging means for engaging the workpiece during said cutting stroke, and spring means operatively connected with said tool holding means for normally urging said stock engaging means at a predetermined preload axially in the downward direction whereby said stock engaging means strips the workpiece away from said punching tool on said retracting stroke, and load adjustment means selectively adjustable for varying said predetermined preload to vary the stripping force to accommodate differences in materials and the condition of said punching tool; said stock engaging means comprising a nose member adapted to engage the workpiece, and position adjustment means operable for selectively varying the axial position of said nose member relative to said punching tool whereby variations in thickness of the workpiece can be accommodated, said nose being generally annular and having a slot for approximately 180° at its lowermost extremity whereby the surface contact of said nose with the workpiece is no greater than approximately 180°, the template being located on the workpiece and in said slot whereby the template can engage said punching tool and the workpiece can be cut to a shape duplicating the template, said punching tool having a cutting edge, said tool holding means and said position adjustment means operable for locating the uppermost position of said cutting edge on said retracting stroke within said slot, said cutting edge located within said slot and relative to the stroke of the reciprocating apparatus such that on said retracting stroke said cutting edge is below the upper surface of the template whereby inadvertent cutting of the template is precluded.

5. The apparatus of claim 4 with said tool holding means comprising an upper tubular member having a bore at its upper end and a reduced diameter tool holding portion at its opposite end adapted to receive and hold said punching tool, said tool stripping means comprising a lower sleeve member slidably supported on said upper tubular members a diametrically extending cross pin connected to the upper end of said upper tubular member and extending through a pair of aligned, axially extending slots in said upper tubular member whereby said upper tubular member and said lower sleeve member are connected for limited relative axial motion, said spring means including a coil spring located within said bore in said tubular member and being operatively engageable with said lower sleeve member, said load adjustment means comprising a cop member threadably supported in the upper end of said bore and engageable with said coil spring and selectively movable axially more or less in said bore for varying the preload on said coil spring.

6. The apparatus of claim 5 further comprising stock support means located in the support table for normally engaging and supporting the workpiece away from the die button, said stock support means comprising resilient means being yieldably movable for moving the workpiece into engagement with the die button in response to movement of said punching tool assembly in said downward cutting stroke and away from the die button upon movement of said punching tool assembly in said upward, retracting stroke whereby burrs formed on the workpiece on said cutting stroke will be lifted out of said die opening thus facilitating workpiece feed without burr hangup.

7. The apparatus of claim 6 with said resilient means comprising an annular spring member generally surrounding the die button.

8. The apparatus of claim 6 with said resilient means comprising a ring of elastomeric material located in a groove generally surrounding the die button.

9. The apparatus of claim 8 with said resilient means comprising a sandwich like structure including an upper ring member and an intermediate ring of elastomeric material.

10. The apparatus of claim 6 including position means for selectively adjusting the vertical position of said stock support means relative to said die opening.

11. The apparatus of claim 6 with the spring rate of said resilient means being selected relative to said preload whereby said resilient means can be substantially fully compressed by a force equal to said preload.

12. In high speed punching apparatus for rapidly, progressively cutting small portions of material from a workpiece along a preselected line and including a support table, a die button supported on the support table, the die button having a die opening and reciprocating apparatus for providing high speed reciprocating motion relative to the support table, the improvement comprising a punching tool assembly adapted to be reciprocated by the reciprocating apparatus, said punching tool assembly including an elongated punching tool adapted to be received within the die opening for reciprocal motion therein, said punching tool providing a shearing action of the workpiece on a downward cutting stroke and being retracted from the workpiece on an upward, retracting stroke, said punching tool having an elongated shank of a straight cylindrical shape, a cutting surface formed proximate one end, said cutting surface extending for only a portion of the cross section of said shank and being defined by a notch in said shank, said cutting surface having a radially extending ridge defined by radially extending surfaces axially receding from said ridge, said notch having axially extending surfaces defining an oblique angle with said radially extending surfaces and connected therewith by a connecting radius whereby said cutting surface, said axially extending surfaces of said notch with said connecting radius inhibit hangup of chips on said cutting surface, tool holding means for removably holding said punching tool and adapted to be held by the reciprocating apparatus, and tool stripping means operatively connected with said tool holding means for stripping the workpiece from said tool on said retracting stroke, said stripping means including stock engaging means for engaging the workpiece during said cutting stroke, and spring means operatively connected with said tool holding means for normally urging said stock engaging means at a predetermined preload axially in the downward direction whereby said stock engaging means strips the workpiece away from said punching tool on said retracting stroke, and load adjustment means selectively adjustable for varying said predetermined preload to vary the stripping force to accommodate differences in materials and the condition of said punching tool.

13. The apparatus of claim 12 with said radius being at last around 0.032 inch.

14. The apparatus of claim 12 with said shank of said punching tool being generally of the same diameter as the die opening, said punching tool having a tip portion extending generally from a position intermediate said cutting surface and the end of said punching tool, said tip portion having an outer, frusto conical shape of a sufficient length such that when fully retracted said tip portion only is located in said die opening in clearance relation with the confronting surface of the die opening whereby rubbing, frictional engagement of said shank of said punching tool and the die opening is minimized.

15. In a high speed punching apparatus for rapidly, progressively cutting small portions of material from a workpiece along a preselected line and including a support table, a die button supported on the support table, the die button having a die opening and reciprocating apparatus for providing high speed reciprocating motion relative to the support table, the combination comprising a punching tool assembly adapted to be reciprocated by the reciprocating apparatus, said punching tool assembly including an elongated punching tool adapted to be received within the die opening for reciprocal motion therein, said punching tool providing a shearing action of the workpiece on a downward, cutting stroke and being retracted from the workpiece on an upward, retracting stroke, tool holding means for removably holding said punching tool and adapted to be held by the reciprocating apparatus, and tool stripping means operatively connected with said tool holding means for stripping the workpiece from the said tool on said retracting stroke, and stock support means located in the support table for normally engaging and supporting the workpiece away from the die button, said stock support means comprising resilient means being yieldably movable for moving the workpiece into engagement with the die button in response to movement of said punching tool assembly in said downward cutting stroke and away from the die button upon movement of said punching tool assembly in said upward, retracting stroke whereby burrs formed on the workpiece on said cutting stroke will be lifted out of said die opening thus facilitating workpiece feed without burr hangup, said resilient means comprising a ring of elastomeric material located in a groove generally surrounding the die button and comprising a sandwich like structure including an upper ring member and an intermediate ring of elastomeric material.

16. The apparatus of claim 15 including position means for selectively adjusting the vertical position of said stock support means relative to said die opening.

17. The apparatus of claim 15 with the spring rate of said resilient means being selected relative to said prelaod whereby said resilient means can be substantially fully compressed by a force equal to said preload.

18. In high speed punching apparatus for rapidly, progressively cutting small portions of material from a workpiece along a preselected line and including a stock support table, a die button supported on the support table, the die button having a die opening and reciprocating apparatus for providing high speed reciprocating motion relative to the support table, the improvement comprising a punching tool assembly adapted to be reciprocated by the reciprocating apparatus, said punching tool assembly including an elongated punching tool adapted to be received within the die opening for reciprocal motion therein, said punching tool providing a shearing action of the workpiece on a downward, cutting stroke and being retracted from the workpiece on an upward, retracting stroke, said punching tool having an elongated shank of a straight cylindrical shape, a cutting surface formed proximate one end, said cutting surface extending for only a portion of the cross section of said shank and being defined by a notch in said shank, said cutting surface having a radially extending surface, said notch having an axially extending surface defining an oblique angle with said radially extending surface and connected therewith by a connecting radius whereby said cutting surface, and said axially extending surfaces of said notch with said connecting radius inhibit hangup of chips on said cutting surface, said shank of said punching tool being generally of the same diameter as the die opening, said punching tool having a tip portion extending generally from a position intermediate said cutting surface and the end of said punching tool, said tip portion having an outer, frusto conical shape of a sufficient length such that said tip portion when located in said die opening can define a clearance relation with the confronting surface of the die opening whereby rubbing, frictional engagement of said shank of said punching tool and the die opening is minimized, tool holding means for removably holding said punching tool and adapted to be held by the reciprocating apparatus, the tool stripping means operatively connected with said tool holding means for stripping the workpiece from the said tool on said retracting stroke, said stripping means including stock engaging means for engaging the workpiece during said cutting stroke.

19. The apparatus of claim 18 with said stock engaging means comprising a nose member adapted to engage the workpiece, and position adjustment means operable for selectively varying the axial position of said nose member relative to said punching tool whereby variations in thickness of the workpiece can be accommodated.

20. The apparatus of claim 19 with said nose being generally annular and having a slot for approximately 180° at its lowermost extremity whereby the surface contact of said nose with the workpiece is no greater than approximately 180°.

21. The apparatus of claim 20 adapted for operation with a template with the template being located on the workpiece and in said slot whereby the template can engage said punching tool and the workpiece can be cut to a shape duplicating the template, said punching tool having a cutting edge, said tool holding means and said position adjustment means operable for locating the uppermost position of said cutting edge on said retracting stroke within said slot, said cutting edge located within said slot and relative to the stroke of the reciprocating apparatus such that on said retracting stroke said cutting edge is below the upper surface of the template whereby inadvertent cutting of the template is precluded.

22. For use in high speed punching apparatus for rapidly, progressively cutting small portions of material from a workpiece along a preselected line and including a stock support table, a die button supported on the support table, the die button having a die opening and reciprocating apparatus for providing high speed reciprocating motion relative to the support table and a punching tool assembly adapted to be reciprocated by the reciprocating apparatus, the improvement comprising an elongated punching tool adapted to be removably held by said punching tool assembly and adapted to be received within the die opening for reciprocal motion therein, said punching tool providing a shearing action of the workpiece on a downward, cutting stroke and being retracted from the workpiece on an upward, retracting stroke, said punching tool having an elongated shank of a straight cylindrical shape, a cutting surface formed proximate one end, said cutting surface extending for only a portion of the cross section of said shank and being defined by a notch in said shank, sid cutting surface having a radially extending ridge defined by radially extending surfaces axially receding from said ridge, said notch having axially extending surfaces defining an oblique angle with said radially extending surfaces and connected therewith by a connecting radius whereby said cutting surface and said axially extending surfaces of said notch with said connecting radius inhibit hangup of chips on said cutting surface.

23. The apparatus of claim 22 with said radius being at least around 0.032 inch.

24. The apparatus of claim 22 with said shank of said punching tool being generally of the same diameter as the die opening, said punching tool having a tip portion extending generally from a position intermediate said cutting surface and the end of said punching tool, said tip portion having an outer, frusto conical shape of a sufficient length such that when fully retracted said tip portion only is located in said die opening in clearance relation with the confronting surface of the die opening whereby rubbing, frictional engagement of said shank of said punching tool and the die opening is minimized.

25. The apparatus of claim 24 with said cutting surface extending axially into the die opening no greater than around 0.016 inch during said cutting strike whereby engagement between said shank and the die opening is for no greater than around the 0.016 inch thus minimizing rubbing frictional engagement.

* * * * *

UNITED STATES PATENT AND TRADEMARK OFFICE
CERTIFICATE OF CORRECTION

PATENT NO. : 4,012,975
DATED : March 22, 1977
INVENTOR(S) : Barry G. LaLone

It is certified that error appears in the above-identified patent and that said Letters Patent are hereby corrected as shown below:

Column 1, line 43, "is is" should be --it is--

Column 2, line 42, "lss" should be --less--

Column 3, line 38, "stipper" should be --stripper--

Column 8, line 28, "last" should be --least--

Column 9, line 13, "prelaod" should be --preload--

Column 10, line 39, "sid" should be --said--.

Signed and Sealed this ninth Day of August 1977

[SEAL]

Attest:

RUTH C. MASON
*Attesting Officer*

C. MARSHALL DANN
*Commissioner of Patents and Trademarks*